United States Patent
Amundson et al.

(10) Patent No.: US 6,285,812 B1
(45) Date of Patent: *Sep. 4, 2001

(54) SWITCHABLE AND RECONFIGURABLE OPTICAL GRATING DEVICES AND METHODS FOR MAKING THEM

(75) Inventors: Karl R. Amundson, Morristown; Benjamin John Eggleton, Berkeley Heights; John A. Rogers, New Providence, all of NJ (US); Jefferson Lynn Wagener, Charlottesville, VA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,198

(22) Filed: Jul. 17, 1998

(51) Int. Cl.[7] .............................. G02B 6/34; G02F 1/1333
(52) U.S. Cl. .............................................. 385/37; 349/201
(58) Field of Search ............................ 385/37, 124, 142, 385/143; 349/201

(56) References Cited

U.S. PATENT DOCUMENTS

| | | | |
|---|---|---|---|
| 3,804,489 | * | 4/1974 | Li et al. ................................. 385/2 |
| 5,007,705 | * | 4/1991 | Morey et al. ..................... 350/96.29 |
| 5,581,162 | * | 12/1996 | Deacon et al. ......................... 385/15 |
| 5,647,039 | * | 7/1997 | Judkins et al. ........................ 385/37 |
| 5,991,071 | * | 11/1999 | Naito ................................... 359/341 |
| 6,058,226 | * | 5/2000 | Starodubov ............................ 385/12 |
| 6,192,177 | * | 2/2001 | Amundson et al. .................... 385/37 |

\* cited by examiner

*Primary Examiner*—Jon Henry
(74) *Attorney, Agent, or Firm*—Lowenstein Sandler PC

(57) ABSTRACT

In accordance with the invention, an optical fiber grating device is made by providing a fiber with an electrically actuable component optically responsive to voltage or current and a plurality of conductive elements to locally activate the component and thereby to produce local optical perturbations in the fiber. In a preferred embodiment, a fiber is provided with a core of liquid crystal material and a plurality of periodically spaced microelectrode pairs. Application of a voltage to the microelectrodes results in a periodic sequence of perturbations in the core index which produces a grating. When the voltage is switched off, the grating switches off. Other embodiments utilize helical conductive elements.

13 Claims, 2 Drawing Sheets

SWITCHABLE AND RECONFIGURABLE OPTICAL GRATING DEVICES AND METHODS FOR MAKING THEM

FIELD OF THE INVENTION

The present invention relates to switchable and reconfigurable optical grating devices and to methods for making them. In particular it concerns optical fiber devices having electrically actuable components and conductive elements which can selectively activate the components to produce grating devices in one or more desired configurations.

BACKGROUND OF THE INVENTION

Optical fibers are key components in modern telecommunication systems. Basically, optical fibers are thin strands of glass capable of transmitting an optical signal containing a large amount of information over long distances with very low loss. In essence, an optical fiber is a small diameter waveguide comprising a core having a first index of refraction surrounded by a cladding having a second (lower) index of refraction. Typical optical fibers are made of high purity silica with minor concentrations of dopants to control the index of refraction.

Optical gratings are important elements for selectively controlling specific wavelengths of light within optical systems such as optical communication systems. Such gratings include Bragg gratings and long period gratings. Such gratings typically comprise a body of material and a plurality of substantially equally spaced optical grating elements such as index perturbations, slits or grooves. Switchability and reconfigurability would both be highly useful in these gratings.

A typical Bragg grating comprises a length of optical waveguide, such as optical fiber, including a plurality of perturbations in the index of refraction substantially equally spaced along the waveguide length. These perturbations selectively reflect light of wavelength $\lambda$ equal to twice the spacing $\Lambda$ between successive perturbations times the effective refractive index, i.e. $\lambda = 2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, adding and dropping signal channels, stabilization of semiconductor lasers, reflection of fiber amplifier pump energy, and compensation for waveguide dispersion.

Waveguide Bragg gratings are conventionally fabricated by doping a waveguide core with one or more dopants sensitive to ultraviolet light, e.g., germanium or phosphorous, and exposing the waveguide at spatially periodic intervals to a high intensity ultraviolet light source, e.g., an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

Difficulties with conventional Bragg gratings are that they are essentially permanent and they filter only a fixed wavelength. Each grating selectively reflects only light in a narrow bandwidth centered around $m\lambda = 2n_{eff}\Lambda$, where $m = 1, 2, 3, \ldots$ is the order of the grating. However in many applications, such as wavelength division multiplexing (WDM), it is desirable to have gratings which can be switched on and off and reconfigurable gratings whose wavelength response can be controllably altered.

Long-period fiber grating devices provide wavelength dependent loss and may be used for spectral shaping. A long-period grating couples optical power between two copropagating modes with very low back reflections. It typically comprises a length of optical waveguide wherein a plurality of refractive index perturbations are spaced along the waveguide by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $\frac{1}{5}\Lambda'$ to $\frac{4}{5}\Lambda'$. In some applications, such as chirped gratings, the spacing $\Lambda'$ can vary along the length of the grating.

Long-period fiber grating devices selectively remove light at specific wavelengths by mode conversion. In contrast with conventional Bragg gratings in which light is reflected and stays in the waveguide core, long-period gratings remove light without reflection, as by converting it from a guided mode to a non-guided mode. A non-guided mode is a mode which is not confined to the core, but rather, is defined by the entire waveguide structure. Often, it is a cladding mode. The spacing $\Lambda'$ of the perturbations is chosen to shift transmitted light in the region of a selected peak wavelength $\lambda_p$ from a guided mode into a nonguided mode, thereby reducing in intensity a band of light centered about the peak wavelength $\lambda_p$. Alternatively, the spacing $\Lambda'$ can be chosen to shift light from one guided mode to a second guided mode (typically a higher order mode), which is substantially stripped off the fiber to provide a wavelength dependent loss. Such devices are particularly useful for equalizing amplifier gain at different wavelengths of an optical communications system.

Conventional long-period gratings are also permanent and they filter only a fixed wavelength. Each long-period grating with a given periodicity ($\Lambda'$) selectively filters light in a narrow bandwidth centered around the peak wavelength of coupling, $\lambda_p$. This wavelength is determined by $\lambda_p = (n_g - n_{ng}) \cdot \Lambda'$, where $n_g$ and $n_{ng}$ are the effective indices of the core and the cladding modes, respectively. The value of $n_g$ is dependent on the core and cladding refractive index while $n_{ng}$ is dependent on core, cladding and ambient indices.

In the future, multi-wavelength communication systems will require reconfiguration and reallocation of wavelengths among the various nodes of a network depending on user requirements, e.g., with programmable add/drop elements. This reconfiguration will impact upon the gain of the optical amplifier. As the number of channels passing through the amplifier changes, the amplifier will start showing deleterious peaks in its gain spectrum, requiring modification of the long-period grating used to flatten the amplifier. Modifying the long-period grating implies altering either the center wavelength of the transmission spectrum or the depth of the coupling.

Thus, there is a need for switchable and reconfigurable Bragg gratings and long period gratings.

SUMMARY OF THE INVENTION

In accordance with the invention, an optical fiber grating device is made by providing a fiber with an electrically actuable component optically responsive to voltage or current and a plurality of conductive elements to locally activate the component and thereby to produce local optical perturbations in the fiber. In a preferred embodiment, a fiber is provided with a core of liquid crystal material and a plurality of periodically spaced microelectrode pairs. Application of a voltage to the microelectrodes results in a periodic sequence of perturbations in the core index which produces a grating. When the voltage is switched off, the grating switches off. Other embodiments utilize helical conductive elements.

Brief Description of the Drawings

The nature, advantages and various additional features of the invention will appear more fully upon consideration of the illustrative embodiments now to be described in connection with the accompanying drawings. In the drawings.

It is to be understood that these drawings are for purposes of illustrating the concepts of the invention and are not to scale.

DETAILED DESCRIPTION

Figure 1:
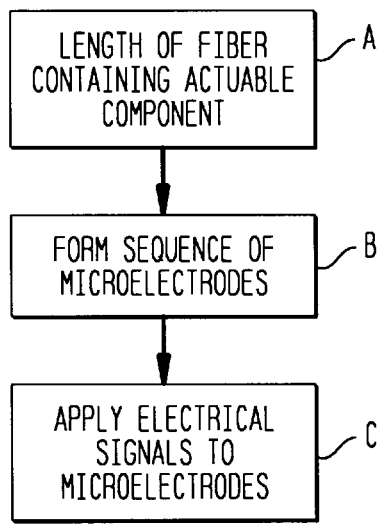
FIG. 1 is a block diagram schematically illustrating the steps in making a switchable grating device in accordance with the invention.

Referring to the drawings, FIG. 1 is a schematic block diagram showing the steps in making an optical fiber grating device in accordance with the invention. As shown in block A, the first step is to provide a length of optical fiber such as single mode or multimode optical fiber.

Either the fiber, as provided, includes an electrically actuable component or such a component is provided at a subsequent point in the process. An electrically actuable component for these purposes is a material which will produce a local perturbation in the optical properites of the fiber in response to the application of voltage across electrode pairs on the fiber or in response to the application of current through a helical conductive element on the fiber. The preferred perturbation is a local change in the refractive index in excess of 0.01%. The actuable component can be an electro-optic material, a magneto-optic material, a piezoelectric material, an electrostrictive material, a magnetostrictive material, or a Faraday effect material. The actuable component is typically disposed in or near the core region of the fiber to interact with the light propagating in the fiber, but can also be coated on the cladding.

Figure 2A:
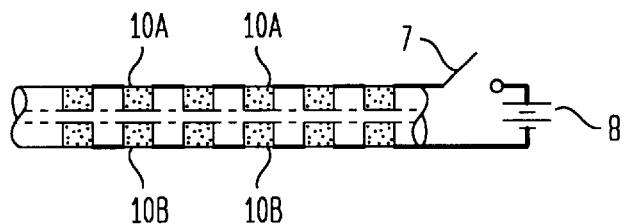
FIGS. 2A, 2B and 2C illustrate electrode configurations useful in the method of FIG. 1.
Figure 2B:
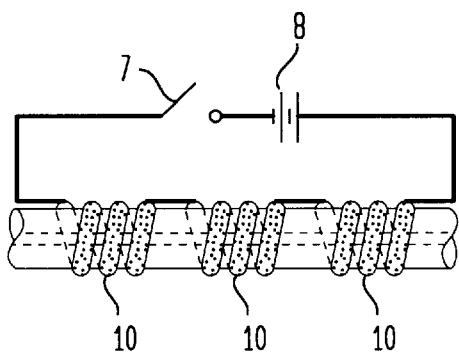
Figure 2C:
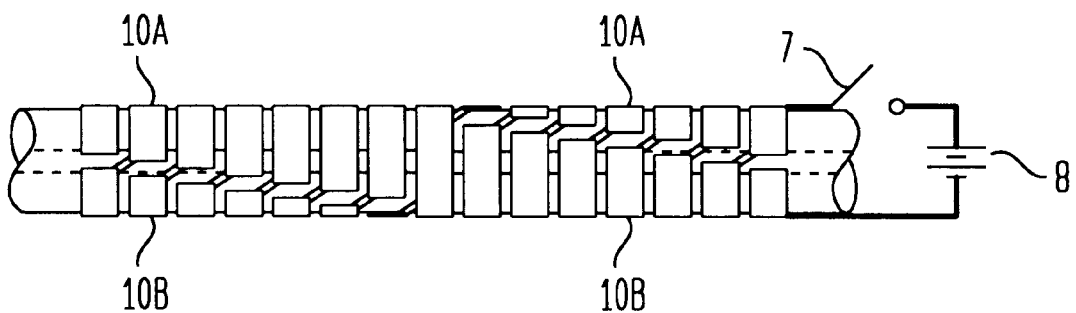

The next step, shown in block B, is to form along the fiber a sequence of small conductive elements (hereinafter "microelectrodes") comprising at least one periodic sequence with spacing appropriate for establishing an optical fiber grating. The microelectrodes can be in a sequence of capacitor electrode pairs 10A and 10B across the fiber diameter as shown in FIG. 2A, a sequence of helical coils 10 about the fiber (FIG. 2B), or a helix of capacitor pairs as shown in FIG. 2C. The spacings (edge-to-edge separations) between successive microelectrodes are typically between 1 mm and 100 micrometers for long period gratings and between 20 micrometers and 200 nanometers for first or higher order Bragg gratings. The periodic sequence should typically extend to at least five microelectrodes for a long period grating and at least 100 microelectrodes for a Bragg grating. The maximum lateral dimension of each microelectrode along the length of the fiber will typically be a fraction (typically 50%) of the spacing.

Such microelectrode structures are preferably formed on the fiber by the microprinting techniques described in U.S. patent application Ser. No. 08/677,309 filed Jul. 9, 1996 by H. Biebuyck et al and entitled "Microcontact Printing on Surfaces and Derivative Articles" and in U.S. patent application Ser. No. 08/616,929 filed Mar. 15, 1996 by R. J. Jackman et al and entitled "Method of Forming Articles and Patterning Surfaces Via Capillary Micromolding", and U.S. patent application Ser. No. 08/681,235 entitled "Fabrication of Small Scale Coils and Bands . . . " filed by Rogers et al., Jul. 22, 1996. All three of these applications are incorporated herein by reference.

The methods are also described in the following articles: John A. Rogers, et al., "Using Microcontact Printing to Generate Photomasks on the Surface of Optical Fibers: A New Method for Producing In-Fiber Gratings," *Applied Physics Letters*, 70(1), 7–9 (1997); John A. Rogers, et al., "Constructing Single and Multiple Helical Microcoils and Characterizing Their Performance as Components of Microinductors and Microelectromagnets," *Journal of Microelectromechanical Systems (JMEMS)* 6(3), 184–102 (1997); and John A. Rogers, et al., "Using Microcontact Printing to Fabricate Microcoils on Capillaries for High Resolution H-NMR on Nanoliter Volumes," *Applied Physics Letters*, 70(18), 2464–2466 (1997). The three by Rogers et al. articles are incorporated herein by reference.

Capacitor pair electrodes of conductive metal can be used with electro-optic actuable materials. They can also be used with piezoelectric actuable materials such as ZnO or PZT, or electrostrictive materials such as KDP. In these latter cases, application of voltage to the capacitors causes, through piezoelectric or electrostrictive effect, localized mechanical strain in the fiber. This compression causes dimensional changes and slight perturbations in the index of refraction in a geometry that mirrors the capacitor array.

Other electrode materials useful in establishing gratings are resistive metal, piezoelectric material, electrostrictive material and magnetostrictive material. The electrodes can be interconnected or individually addressable.

Helical microelectrodes as shown in FIG. 2C can be used with actuable materials that display the Faraday effect (e.g. Fe, Ni or Co) placed in or near the fiber core. Alternatively, with sufficient current, the helical electrodes will heat sufficiently to produce periodic changes in index or dimension in a thermo-optic actuable material or with a material that exhibits sufficient changes in dimension due to thermal expansion, respectively. The silica glass itself undergoes changes in index with temperatures that are suitably large (e.g. a change of 50° C.).

The helix of microelectrode pairs shown in FIG. 2C can be used with actuable materials as described for the FIG. 2A structures. However it has the added advantage of ensuring that the electrical fields are applied in a direction which varies along the length of the grating, thus providing an operation that is independent of polarization.

The third step shown in block C, is to apply electrical signals to the microelectrodes to form the periodic sequence of index perturbations constituting a grating. As illustrated in FIG. 2A, switch 7 applies voltage from source 8 across capacitor pairs 10A and 10B and thus across the fiber. In FIG. 2B, switch 7 applies current from source 8 through the inductor electrodes 10, thereby forming a magnetic field within the fiber. As a practical matter the perturbation should be achievable by voltages of less than 10 KV or currents less than 10A.

Figure 3:
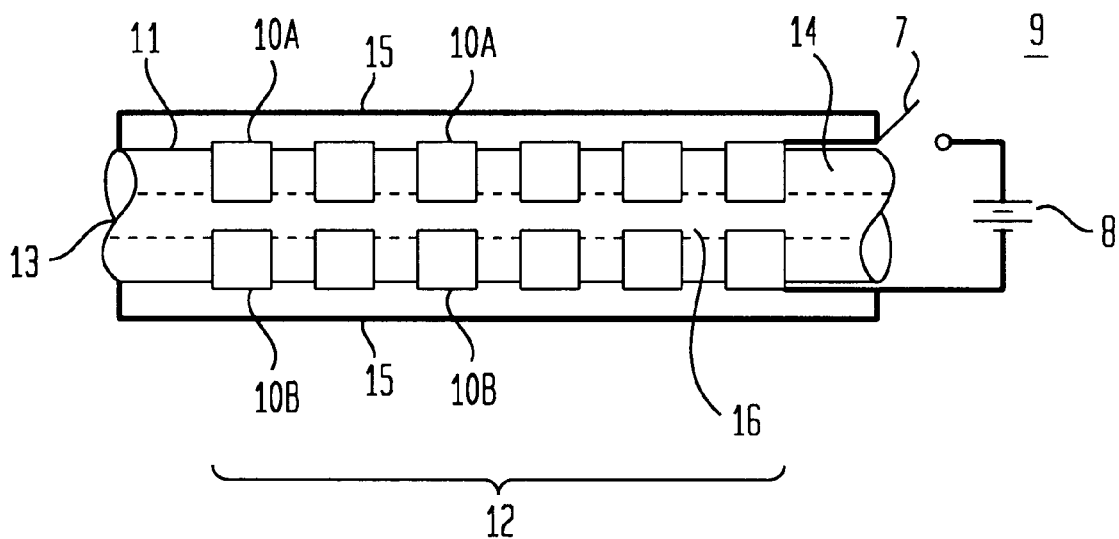
FIG. 3 schematically illustrates an exemplary embodiment of a switchable grating device.

FIG. 3 schematically illustrates an exemplary optical device 9 made by the process of FIG. 1. The device 9 comprises a periodic sequence of opposed pairs of capacitor electrodes 10A and 10B along a length of optical fiber 11 to establish an optical grating 12. The fiber 11 typically comprises a central core 13, an outer cladding 14 and may include an outer protective polymeric coating 15. The fiber includes along the region of grating 12 a voltage actuable component 16 responsive to voltage applied to the electrodes for producing variations in the fiber refractive index. The component 16 is preferably disposed in the fiber core. The fiber 11 can be single mode or multimode.

In operation a voltage from source 8 applied to the electrodes (across opposing electrodes 10A and 10B) acts locally on component 16 in essentially the region underlying the electrodes to produce a sequence of refractive index perturbations (not shown) in the fiber. This sequence establishes a grating. The spacing of the grating depends on which electrodes are activated. For example, voltage could be applied to every electrode along the length or it could be applied to alternate electrodes along the length, producing a grating with twice the minimum spacing possible with a given electrode structure. Thus the grating is reconfigurable by choice of voltage distribution to the electrodes. When the voltage is removed, the refractive index perturbations rapidly dissipate. The grating is no longer present in the fiber light path. Thus the device is switchable. Moreover, for most actuable materials the index perturbation is proportional to the applied voltage which means that the strength of the grating can be dynamically adjusted by varying the voltage.

The nature and method for making such devices may be more clearly understood by consideration of the following examples.

EXAMPLE 1

Capacitor Microelectrodes/Electro-Optic Actuable Material

A single-mode fiber whose core contains a material with a significant electro-optic response is produced, for example, by filling a hollow fiber (125$\mu$m outer diameter, 3$\mu$m inner diameter) with a liquid crystal. A wide variety of liquid crystals with desirable electro-optical properties are available from E. Merck, for example. For this case, a liquid crystal or a mixture of liquid crystals is chosen so that the ordinary refractive index is ~3% greater than the refractive index of the glass (1.444) at the wavelength of 1550 nm.

An array of capacitor microelectrodes having a periodicity for establishing a long period grating is formed along the fiber. Calculations indicate that a periodicity of ~49$\mu$m produces an attenuation dip at 1550 nm which would be useful to flatten the gain profile of an erbium-doped amplifier. Each of the capacitors in the array is designed such that the orientation of the induced electric field varies continuously from 0 to 180 degrees (i.e. the plates of the capacitor spiral once around the outside of the fiber). This structure reduces polarization sensitivity of the device. The entire length of the grating (~4 cm) is chosen to ensure strong attenuation at 1550 nm with sufficiently narrow-bandwidth (~10 nm). About ~25 angstroms of Ti, and about 1000 angstroms of Ag are evaporated onto the entire outside surface of the fiber. An array of interconnected parallel-plate capacitors are printed onto the outside of the fiber by the steps of: 1) Designing a chrome-on-quartz mask with the geometry of the pattern to be printed on the fiber, 2) Performing photolithography with this photomask to generate a pattern in photoresist (Shipley 1818, thickness ~2 $\mu$m) on a silicon wafer, 3) Fluorinating the exposed regions of the silicon by placing the wafer in a silane vapor (tridecafluoro-1,1,2,2-tetrahydrooctyl-1-trichlorosilane), 4) Pouring a liquid prepolymer to polydimethylsiloxane (Dow Corning Sylgard 184) onto the wafer, 5) Curing the elastomer by heating at 85° C. for ~2 hours, 6) Removing elastomer and applying a solution of hexadecanethiol (HDT) in ethanol (~1 mM) to the surface of the elastomer, 7)Using translation and rotation stages, orienting the fiber relative to the pattern on the stamp, bring the fiber into contact with the stamp, and roll the fiber over its surface, 8) Placing the printed fiber into a liquid etchant (1 mM $K_4Fe(CN)_6$, 10 mM $K_3Fe(CN)_6$, 0.1 M $Na_2S_2O_3$ in water) that removes the silver not coated with HDT, 9) Placing the etched fiber into ~1% HF for ~10 s to remove the exposed Ti, and 10) Making electrical connection with silver epoxy.

A grating is established by applying an AC voltage. The liquid crystal will reorient in regions of the fiber where there is an electric field (i.e. in those regions that contain a capacitor). This re-orientation changes the index of refraction, and induces a grating whose periodicity matches that of the capacitor array.

EXAMPLE 2

Inductor Microelectrodes/Magnleto-Optic Actuable Material

A device was made as in Example 1 except the electrodes were arrays of spiral solenoidal inductors. Applying AC current to the inductor array produces a magnetic field in the core of the fiber that aligns the liquid crystal, changes its index of refraction and induces a grating whose periodicity matches that of the inductor array. To insure a strong modulation of the field, the spirals should have alternating helicities.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A reconfigurable optical fiber grating device comprising:

a length of optical fiber having an outer circumference and a diameter and a plurality of spaced-apart conductive element pairs on the outer circumference of the optical fiber, wherein each conductive element pair comprises a first conductive element on one side of the diameter and a second conductive element on the other side of the diameter, the plurality of conductive element pairs defining a grating region along said fiber and within said fiber an actuable component responsive to an electrical signal applied to each conductive element pair for producing a respective localized perturbation in the optical properties of the fiber;

each conductive element pair subject to the selective application of voltage to produce a respective localized perturbation of the fiber and said plurality of conductive element pairs positioned and spaced for producing a sequence of localized perturbations forming an optical grating wherein the wavelength response of the optical grating can be controllably altered between wavelengths by selective application of voltage to said conductive element pairs.

2. The grating of claim 1 wherein said conductive elements produce said index perturbations in said fiber by local heating.

3. The grating of claim 1 wherein said actuable component comprises an electro-optic material, a magneto-optic material, a piezoelectric material, an electrostrictive material, a magnetostrictive material or a Faraday effect material.

4. The grating of claim 1 wherein said conductive elements comprise a piezoelectric material, an electrostrictive material or a magnetostrictive material.

5. The grating of claim 1 wherein said conductive elements comprise helical elements.

6. The grating of claim 1 wherein said optical fiber grating comprises a Bragg grating and said conductive element pairs are spaced apart by spacings in the range 20 micrometers to 2000 nanometers.

7. The grating of claim 6 comprising at least 100 conductive element pairs spaced apart along said grating region.

8. The grating of claim 1 wherein said optical fiber grating comprises a long period grating and said conductive elements are spaced apart by spacing in the range 1 millimeter to 100 micrometers.

9. The grating of claim 8 comprising at least 5 conductive elements spaced apart along said grating region.

10. The grating of claim 1 in which each conductive element pair is disposed over a substantial portion of the optical fiber circumference.

11. The grating of claim 1 in which each of the first and second conductive elements of each conductive element pair is disposed over greater than twenty-five percent of the optical fiber circumference such that each conductive element pair is disposed over greater than fifty-percent of the optical fiber circumference.

12. The grating of claim 10 in which each conductive element pair is spaced apart by a distance less than the diameter of the fiber.

13. The grating of claim 1 in which the plurality of conductive element pairs are patterned by micro-contact printing.

* * * * *